(12) United States Patent
Fisher

(10) Patent No.: US 7,992,525 B1
(45) Date of Patent: Aug. 9, 2011

(54) ANIMAL TRAINING DEVICE

(76) Inventor: Terri L. Fisher, Burlington, MA (US)

( * ) Notice: Subject to any disclaimer, the term of this patent is extended or adjusted under 35 U.S.C. 154(b) by 213 days.

(21) Appl. No.: 12/317,876

(22) Filed: Dec. 30, 2008

Related U.S. Application Data

(60) Provisional application No. 61/018,090, filed on Dec. 31, 2007.

(51) Int. Cl.
*A01K 15/02* (2006.01)
*A01K 27/00* (2006.01)

(52) U.S. Cl. .......................................... 119/860

(58) Field of Classification Search ............... 119/604, 119/654, 656, 666, 718, 719, 775, 792, 821, 119/822, 855, 858, 859, 860; 340/573.3
See application file for complete search history.

(56) References Cited

U.S. PATENT DOCUMENTS

| | | | |
|---|---|---|---|
| 254,156 A * | 2/1882 | Ricker et al. ................ | 119/654 |
| 1,127,249 A * | 2/1915 | Hughes ........................ | 119/654 |
| 1,262,447 A * | 4/1918 | Carr .............................. | 40/303 |
| 2,138,040 A * | 11/1938 | Perry ............................ | 119/654 |
| 2,349,713 A * | 5/1944 | Finch ........................... | 119/860 |
| 2,658,478 A * | 11/1953 | Jones ............................ | 119/822 |
| 2,791,202 A * | 5/1957 | Doyle .......................... | 119/654 |
| 2,808,030 A * | 10/1957 | Costanzo ..................... | 119/860 |
| 3,687,112 A * | 8/1972 | Henderson .................. | 119/821 |
| 3,874,339 A * | 4/1975 | Coulbourn .................. | 119/792 |
| 4,180,013 A * | 12/1979 | Smith .......................... | 119/718 |
| 4,627,385 A | 12/1986 | Vinci | |
| 4,972,684 A * | 11/1990 | Aitken ......................... | 63/8 |
| 5,046,453 A | 9/1991 | Vinci | |
| 5,125,365 A * | 6/1992 | Bonilla ........................ | 119/776 |
| 5,217,143 A * | 6/1993 | Aitken ......................... | 222/78 |
| 5,494,002 A | 2/1996 | Greene | |
| 5,566,645 A | 10/1996 | Cole | |
| 5,911,199 A | 6/1999 | Farkas et al. | |
| 5,961,003 A * | 10/1999 | Coryell ........................ | 222/175 |
| 5,980,496 A * | 11/1999 | Jacobsen et al. ............. | 604/289 |
| 6,003,474 A | 12/1999 | Slater et al. | |
| 6,047,664 A | 4/2000 | Lyerly | |
| 6,101,980 A | 8/2000 | Davies-Ross | |
| 6,223,744 B1 * | 5/2001 | Garon .......................... | 128/200.14 |
| 6,327,998 B1 | 12/2001 | Andre et al. | |
| D454,991 S | 3/2002 | Muller | |
| 6,367,428 B1 * | 4/2002 | Forte ............................ | 119/863 |
| 6,382,137 B1 * | 5/2002 | Derrieu et al. ............... | 119/654 |
| 6,588,376 B1 * | 7/2003 | Groh ............................ | 119/860 |
| 6,612,264 B2 | 9/2003 | Levine | |
| 6,668,760 B2 * | 12/2003 | Groh et al. ................... | 119/718 |
| 6,820,571 B2 | 11/2004 | Cory | |
| 6,830,013 B2 * | 12/2004 | Williams ..................... | 119/765 |
| 2004/0173163 A1 * | 9/2004 | Bond et al. .................. | 119/651 |
| 2006/0037557 A1 * | 2/2006 | Gordon ........................ | 119/654 |
| 2007/0261645 A1 | 11/2007 | Van de Merwe et al. | |

* cited by examiner

*Primary Examiner* — Rob Swiatek
*Assistant Examiner* — Ebony Evans
(74) *Attorney, Agent, or Firm* — The Patent Practice of Szmanda & Shelmut, LLC

(57) ABSTRACT

A device for humanely controlling an animal's behavior while on a restraining device such as a leash by using the resistant force between animal and restraint to engage a trigger that activates release of a distracting or deterrent spray or gas, or a sound. The device is attached to the animal's body, with the triggering mechanism against the animal's skin. In its application as a means to train dogs to walk on a loose leash, the trigger may be situated inside a collar, such that triggering occurs when the dog pulls the leash taut. Triggering can also occur if the user pulls back on the leash to administer a correction. The trigger's springiness additionally provides shock-absorbing protection to the animal's neck. Embodiments with enhanced features, based on the same mechanical principle, are also described.

20 Claims, 12 Drawing Sheets

ANIMAL TRAINING DEVICE

CROSS-REFERENCE TO RELATED APPLICATIONS

This application claims the benefit of provisional patent application Ser. No. 61/018,090, filed 2007 Dec. 31 by the present inventor.

FEDERALLY SPONSORED RESEARCH

Not Applicable

SEQUENCE LISTING OR PROGRAM

Not Applicable

REFERENCES CITED

U.S. Patent Documents

| | | |
|---|---|---|
| 4,627,385 | Vinci | Dec. 9, 1986 |
| 5,494,002 | Greene | Feb. 27, 1996 |
| 5,566,645 | Cole | Oct. 22, 1996 |
| 5,911,199 | Farkas, et al. | Jun. 15, 1999 |
| 6,003,474 | Slater, et al. | Dec. 21, 1999 |
| 6,047,664 | Lyerly | Apr. 11, 2000 |
| 6,327,998 | Andre, et al. | Dec. 11, 2001 |
| D454,991 | Muller | Mar. 26, 2002 |
| 6,612,264 | Levine | Sep. 2, 2003 |
| 6,668,760 | Groh, et al. | Dec. 30, 2003 |
| 6,820,571 | Cory | Nov. 23, 2004 |
| 7,174,856 | Neri | Feb. 13, 2007 |
| Application 20070261645 | Van De, et al. | Nov. 15, 2007 |

BACKGROUND

1. Field of Invention

This invention relates to animal training, specifically to devices for training an animal such as a dog to discontinue undesired behaviors such as pulling, when attached to a leash or other restraining device.

2. Prior Art

Because animals, such as dogs, are generally required by law to be on a leash when in public, and because walking an animal is often its only available exercise, various training strategies and devices have been developed over the years to try to control an animal's behavior while on a leash. Some professional trainers prefer the use of training strategies alone without any special devices, but among the vast population of animal owners, access to training devices has long been welcomed. Existing devices break down into correction devices, which rely on negative reinforcement to instill long-term behavioral changes; and behavioral management devices, which attempt to manage leash pulling during a walk, with less certain claims to long-term behavioral change.

Among correction devices, the most familiar are choke collars (also known as slip collars or choke chains), prong collars (also known as pinch collars), and shock collars (also known as electronic collars). The underlying principle of these particular devices is that through repeated administration of physical discomfort to the animal's neck by a skilled and judicious user, the animal's inappropriate behavior, be it leash pulling or another unwanted behavior, will be corrected over time. However, these two operational characteristics—reliance on physical discomfort and on the qualifications of the user—set the stage for serious injuries to the animal as well as poor training results. For example, correct use of a choke collar entails positioning the device in one of two possible orientations on the dog's neck and applying a quick tightening and release action. User errors can be easily committed with respect to both the orientation used and the amount of tightening applied; the former error being especially grave in that the collar's release feature is fully disabled. As a result, numerous animal neck injuries and deaths have occurred in association with choke collars. Also, correction collars of this type are not appropriate for use with an extendible leash.

Insufficiency of user skill and/or an excess of physical discomfort to the animal are likewise operational risks inherent to the other above named examples in the correction device category, with consequences similarly ranging from poor training results to serious animal injuries. The prong collar additionally has the drawback of presenting a frightening appearance, even when not engaged. Accidents can also occur when these correction devices are left on an animal unattended.

However, even where appropriately used and behaviorally effective, correction devices that administer discomfort or pain are increasingly rejected by pet owners in favor of more humane sanctioning methods, such as spraying animals with odorless or aversive fluids or generating startling sounds. An example of a spray device is the electronic remote citronella collar, such as is described in U.S. Pat. No. 5,868,103. Such devices enable an owner to remotely administer a spray of citronella, which is found offensive by many animals. Although considered humane, the effectiveness of this device is easily compromised if a user fails to execute the split second timing required for an animal to associate the punishment with a behavior. Moreover, remote collars have the potential to misfire, further complicating the training. Also, because existing citronella collars are electronic, they entail the inconvenience of battery replacement or recharging, as well as the environmental concerns associated with battery disposal. (Shock collars are also subject to the concerns inherent in an electronic device.) Devices that use an electric wire connection rather than a wireless connection between owner and animal to facilitate owner-activated spraying, as proposed in U.S. Pat. No. 6,327,998 by Andre et. al., also share the drawbacks intrinsic both to electronic devices and to devices that depend on user skill. Correction devices that employ sound deterrence are considered humane, and in devices such as described in U.S. Pat. No. 5,494,002 by Greene, do not depend on user skill; however, they typically fall short of intended training goals because the sound emitted tends to be ignored by the animal, yet be bothersome to the owner and passersby. U.S. Pat. No. 5,911,199 proposes a correction device that is self-activating in response to varying degrees of pulling by an animal on a leash, however the corrective feedback is in the form of electrical stimulus pulses, which can cause pain to the animal.

Many animal owners have turned to behavior management devices, as they are generally more humane than existing correction devices; however, these devices typically do not make claims to lasting behavioral change, nor do they have the versatility of most correction devices to address behaviors other than leash pulling. The leading management devices are harnesses and halters. Harnesses distribute the force of pulling to the animal's torso, thereby tending to avoid neck related injuries and strangulation. However, their aptness for training is questionable. Indeed, many argue that sled dogs wear harnesses specifically because they promote pulling. As such, standard harnesses have been relegated primarily to use with smaller animals whose leash pulling is not troublesome enough to warrant correction, but whose fragile necks benefit from a harness's neck protective advantages over regular collars. Larger animals, for whom control is required, are typically not well served by harnesses. The fact that the leash does not attach to the neck area makes it near impossible to "steer" and signal the animal, as required for management, let alone training. One type of harness, such as is described in U.S. Pat. No. 7,107,939 by Lady, attempts to address the "steering" issue by positioning the leash connector in the middle of the forechest rather than at the back. However, since the sizing challenges common to harnesses still obtains, such devices must effectively overcome the possibility of the "steering" juncture becoming displaced, or of an animal slipping out of a harness altogether. Additionally, because harnesses require either a multiplicity of straps or a single complexly looped strap, they tend to be both hard to fit and inconvenient to repeatedly put on and take off an animal. Finally, to the degree that harnesses are designed for mobility constraint and are prone to be imperfectly fit, they can cause shoulder injuries, chafing of the animal's legs, or gagging.

Halters, the other leading management device, are designed for pets such as dogs with the same intent as a horse's halter; namely, to control the direction of the animal's body by controlling the head. As such, they typically contain a strap behind the animal's head and over the muzzle, with the leash attachment at the animal's head. U.S. Pat. No. 4,838, 206 by Anderson et al. provides an example of a halter. While some owners of dogs, particularly large ones, report good results with a halter, the halter's drawbacks make this device inappropriate for many animals and owners. The most widely reported drawback is that many animals simply do not accept wearing a halter and have even been known to rub their muzzles against the ground in an effort to remove it. Other animals require a long adjustment period. Average animal owners also must assume responsibility for using halters correctly, as evidenced by the existence of literature published on the art of managing dogs with a halter. Additionally, since a halter resembles a restraining muzzle in appearance, owners must be reconciled to this perception when walking their animals publicly. Other concerns are that the muzzle strap in some designs may make it difficult for the animal to open its mouth to pant, drink, or receive food rewards. Because the leash is attached to the halter at the head, the user must take care not to allow any twisting strain to the animal's neck, which could cause serious injury. For this reason, the halter is not appropriate for use with an extendible leash.

Hence there is the need for a device that, like choke collars and other early correction devices, offers generic control of a range of behaviors, not just leash pulling; and moreover, provides long-term stimulus-response conditioning rather than the temporary and limited control of a management device like the halter. The invention described herein fills this need while overcoming limitations of existing correction devices; namely, over-reliance on user skill; inhumane or ineffective sanctioning means; high susceptibility to injury infliction though ignorant misuse; risks when left on an animal unattended; inappropriateness for an extendible leash; frightening appearance to passersby; and reliance on electronics, with its associated expense, inconvenience, and known instances of malfunctioning.

SUMMARY OF THE INVENTION

The object of this invention is to humanely control the behavior of an animal that is attached to a restraint such as a leash or tie-out. In its numerous embodiments, the device, which is mechanically trigger-activated, is worn by an animal such that the force of the animal's body against a taut restraint depresses the triggering mechanism to activate release of a sanctioning substance or sound. Embodiments used with a leash can condition the animal to walk on a loose leash by releasing an odorless or odorous substance that causes a distraction or deterrence when the animal pulls the leash taut. The distraction or sanction occurs as a direct and immediate response to the animal's pulling, rather than requiring a perfected trainer technique. Since dogs frequently pull on leash to follow a scent, release of an aversive scent for leash pulling is particularly appropriate as an olfactory interception. An individual walking a dog could also initiate a correction at will for behaviors such as barking or drifting in a lateral arc from the dog walker by pulling the leash taut to release the distraction or deterrence. Embodiments in use with a tie-out could be purposed to condition an animal not to pull the tie-out to its full length, which might otherwise result in neck injury. The springiness of the triggering mechanism serves additionally as a shock absorber for the animal's neck.

In embodiments that use fluid release as the sanction and a resilient bladder as the fluid reservoir, the triggering mechanism is the reservoir itself. Compression of the resilient bladder forces fluid from the bladder through an outlet consisting of one or more holes. Other embodiments use a discrete reservoir for a fluid or gas. In some of these embodiments, the triggering mechanism consists of a spring-loaded lever as found commonly in spray bottles or aerosol cans. In others of these embodiments, the trigger mechanism is a squeeze bulb, with a spray or gas diffusion assembly for the outlet, as exemplified by perfume atomizers.

Some of the above embodiments are adapted to be removably secured to paraphernalia the animal regularly wears for attachment to a restraining device, such as its collar or harness. Other embodiments are secured directly to both the animal and to the restraining device. Some embodiments further include trigger threshold adjustability; a means to optimize positioning of the substance dispersion device, for example against rotation around an animal's neck; wind compensation; substance depletion indicators; directional control for the substance outlet; enhanced cushioning on the triggering mechanism; and a sound making device. Embodiments are also possible in which all training components are optional add-ons via tubing and Velcro® (or similar securing material) to a trigger-ready collar.

DETAILED DESCRIPTION

The same numbers are used on different drawings to identify components serving equivalent functions.

Figure 1:
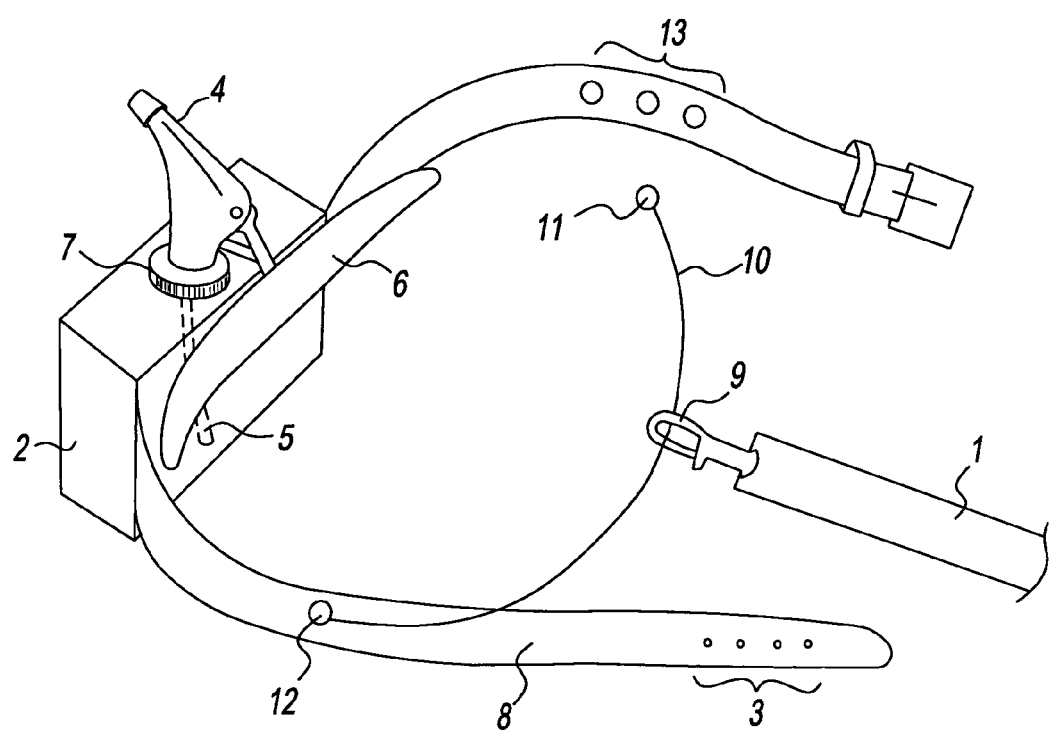
FIG. 1 is a perspective view of a preferred embodiment of the invention.

FIG. 1 is a perspective view in which can be seen an attachment component 8 that secures to an animal; a restraint connector 10 on the attachment component 8 to which the restraining device 1 is connected; a reservoir 2; an outlet 4; and a triggering mechanism 6. In a typical usage of this embodiment to walk a dog, the attachment component 8 would be fitted to a dog's neck with the triggering mechanism 6 resting lightly across the front of the dog's neck, while a leash 1 is attached from behind to the restraint connector 10. The attachment component 8 is size adjustable for different animals, accomplished through any of numerous means known in the art of size adjustable attachments, as for example with a standard buckle closure with holes 3. The triggering mechanism 6 in this example is a lever 6 contoured for a dog's neck and made of material that is substantially rigid while allowing for enough flexibility toward the extremities to bend as needed within the collar. The lever 6 is spring-loaded in like manner to the trigger of an ordinary plastic spray bottle and as is standard in the art of trigger mechanisms. The triggering mechanism 6 becomes temporarily depressed as a result of the dog's forward movement in opposition to a taut leash 1, or as a result of the dog walker pulling the leash 1 taut. It is envisioned that a great many variations in lever dimensions and materials are possible to fulfill the lever's functionality; however, an elongate shape, as exemplified in this figure, favors its responsiveness to pressure even when the nozzle 4 is not in a direct line with the leash 1, but is somewhat offset. When depressed to the triggering threshold, the triggering mechanism 6 causes fluid to be drawn from the reservoir 2 for release through the outlet 4, which in this embodiment, is a spray nozzle assembly 4 including intake tube 5, that is based on known spray bottle technology. Additional nozzle(s) that are in communication with the triggering mechanism 6 may be added in order to disperse the fluid to a wider area to compensate for wind dispersion of the spray. The triggering mechanism 6 may further include a means for threshold adjustability as for example through varying the tension of the spring loaded lever 6, either by the end user or as pre-configured nozzle assemblies 4. The triggering mechanism 6, in addition to activating the release of fluid, also distributes energy to the spring inside the nozzle assembly 4 when depressed, thereby offering shock absorbing protection for the animal's neck. To enhance shock absorbing effects, the lever 6 may be constructed with or covered with materials possessing shock absorbing properties, such as a spongy material or padding. The apparatus may hence be used strictly for the purpose of the neck protection afforded by the triggering mechanism 6; as for example in the case of an animal that has completed its training. The reservoir 2 may be refilled with a liquid of choice such as water, vinegar, citronella, or bitter apple, via the refill cap 7 that is integrated with the spray nozzle assembly 4. The refill cap 7 may be adapted with child-proof features, or the reservoir may use a standard injection port instead of a refill cap. The injection port may further be designed with a keyed opening that accepts only the specific refill injector shape of proprietary products, as is known in the art of refill injectors.

Alternative to a reservoir 2 that is refilled by the end user, the apparatus may be designed with a housing that allows for insertion and removal of ready-made cartridges, as for example containing citronella. The nozzle assembly 4 may further be designed for pivoting, extensibility, and/or varying the stream properties of the nozzle, as known in the art of fluid outlets and nozzles, in order to optimize fluid release for individual animals or training purposes. The restraint connector 10 of FIG. 1 is composed of a smooth, rigid substance and is curved to allow the leash clasp 9 to slide along the restraint connector 10 in response to any lateral movement by the animal. To facilitate putting the apparatus on the animal and taking it off, the restraint connector 10 is pivotally attached to one end 12 of the attachment component 8 and removably attached to one of multiple connection points 13 at the opposite end of the attachment component 8 using a clasping mechanism 11, as known in the art of clasping mechanisms. The availability of multiple connection points 13 allows for size adjustability among animals. The curved restraint connector 10 and the elongate design of the lever 6 are examples of approaches to compensate for rotation of a collar, although other approaches are possible. At present I believe the embodiment shown in FIG. 1 operates most efficiently, but other embodiments are also satisfactory.

Figure 2:
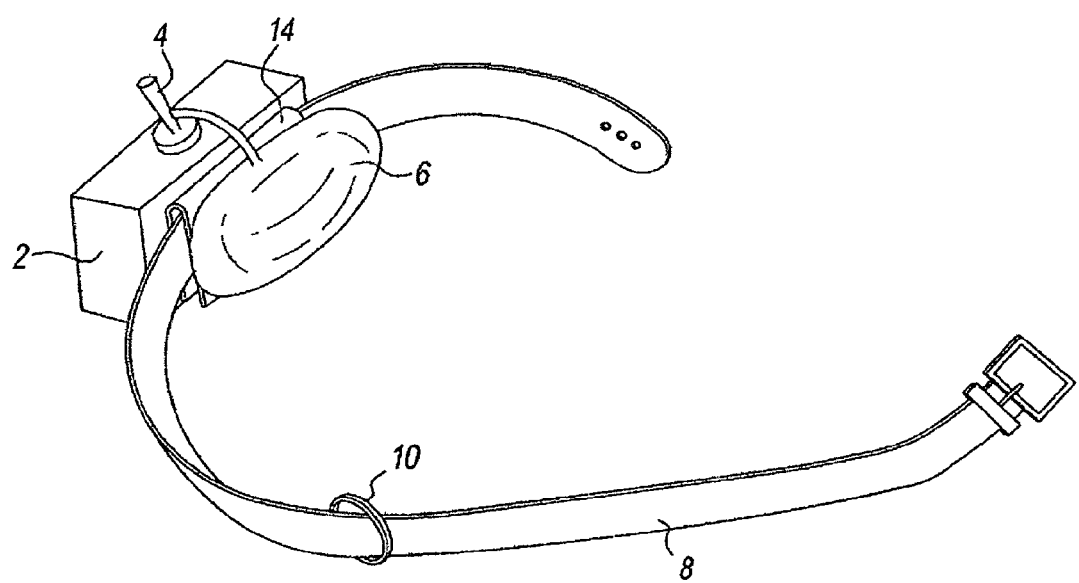
FIG. 2, FIG. 3, FIG. 3A, FIG. 4 through FIG. 9, FIG. 10, FIG. 10A, FIG. 11, FIG. 12, and FIG. 12A depict alternative preferred embodiments of the invention comprising variations in triggering mechanism, attachment component, reservoir, outlet, refill means, and/or sanctioning means.

FIG. 2 depicts an embodiment in which the attachment component 14 is a clip 14 or similar fastening device known in the art of fasteners, which is adapted for attachment to paraphernalia 8 already worn by the animal; in this case, its everyday collar 8. The existing paraphernalia is then attached via its own restraint connector 10 to the restraining device, such as a leash or tie-out. The portability of the apparatus offered by this embodiment is of interest in certain situations; namely, where the apparatus is shared among multiple dogs in a household; where there is a desire to eliminate collar changes before and after a training session; and where sensory consistency between "training" collar and "everyday" collar is sought—an issue of known relevancy to some dogs' behavior; i.e., the dog will only obey when her "training" collar is on. In the embodiment of FIG. 2, the triggering mechanism 6 is a squeeze bulb 6, of the type known in the art of perfume atomizers and squeeze bulb technology. The reservoir 2 and outlet 4 are also based on atomizer technology. The resilient properties of the squeeze bulb triggering mechanism 6 serve additionally as a shock absorber for the animal's neck.

Figure 3:
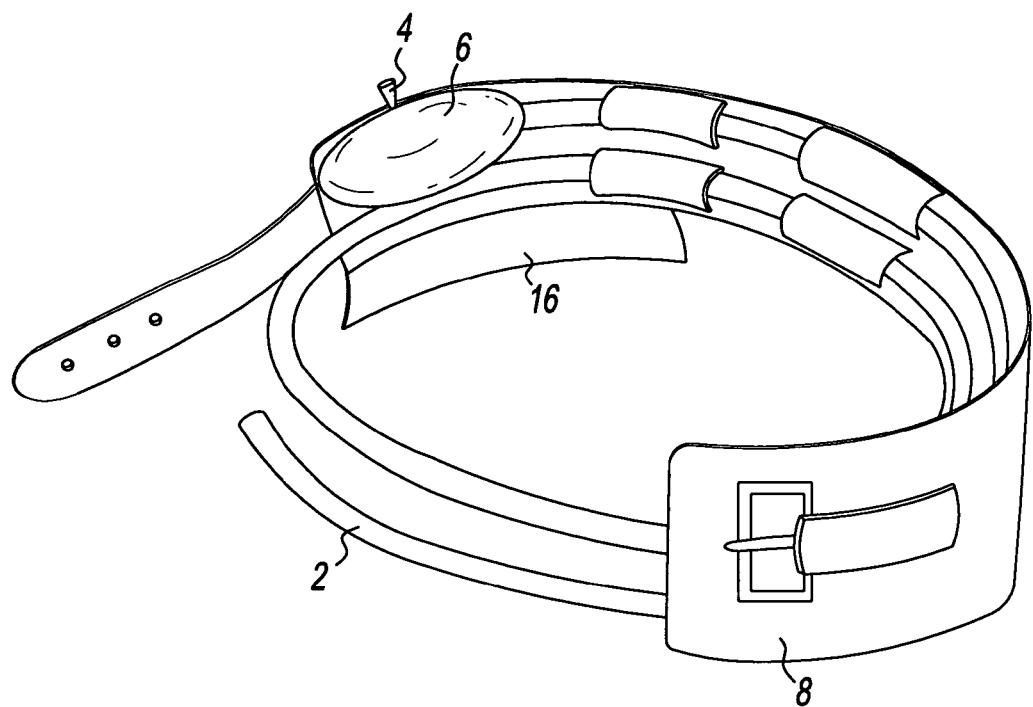
Figure 3A:
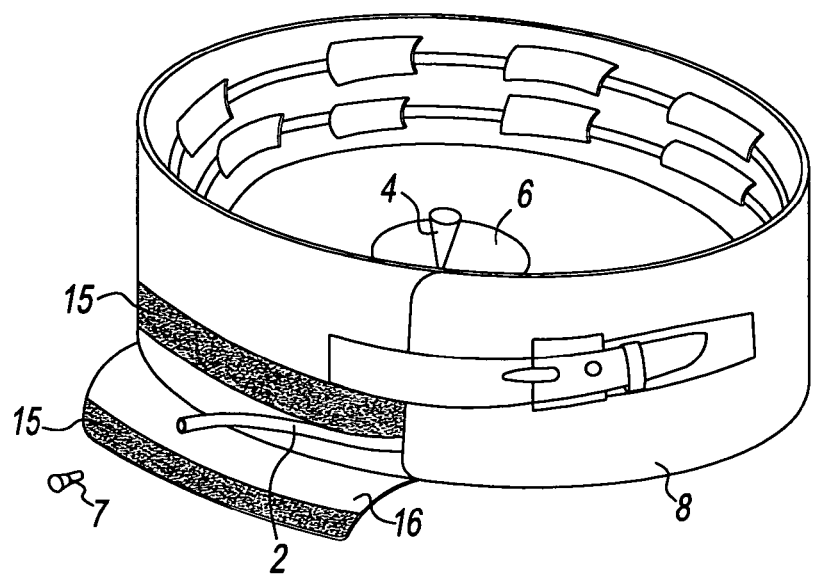

FIG. 3 and FIG. 3A depict respectively an open rear view and closed front view of an embodiment that uses a squeeze bulb 6 for its triggering mechanism 6. This embodiment coils its reservoir 2 within the attachment component 8, to be fitted around an animal's neck. When the attachment component 8 is pulled closed, the refill cap 7 is used to stopper the coiled reservoir 2, which is then covered over by a flap 16. The flap can be secured to the attachment device with a temporary binding material such as Velcro® 15.

Figure 4:
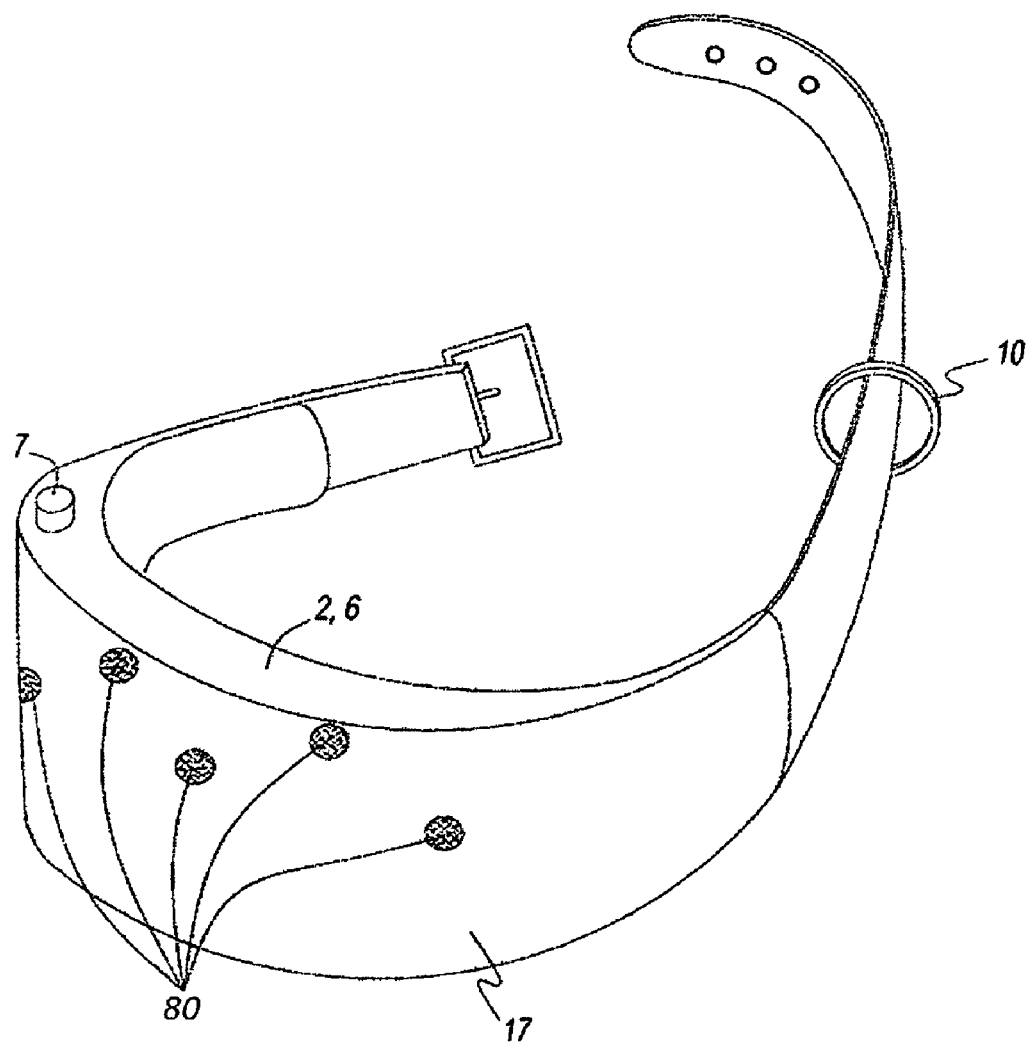

FIG. 4 depicts an embodiment in which the reservoir 2 and triggering mechanism 6 are one and the same; specifically, a bladder-like component. A multiplicity of holes 4 in the bladder-like component 2 serve as the outlet 80, providing redundant spraying to counter any wind dispersion or collar rotation. The reservoir/triggering mechanism 2, 6 may be filled with a fluid of the end user's choosing via a refill screw cap 7 or similar re-closable structure known in the art of receptacle closures. Alternative filling options such as injectors for pre-packaged fluids are also possible. The reservoir/triggering mechanism 2, 6 is constructed of a resilient material such that it yields to pressure of an animal's body, thereby directly forcing fluid from the reservoir/triggering mechanism 2, 6 through the outlet 80 in a continuous stream or streams, subject to the duration of the appropriate pressure. Based on principles known in the art of materials science and fluid dispersion, the reservoir/triggering mechanism's 2,6 dimensions are configured to allow for consistency in the pressure needed to disperse the fluid even as it becomes depleted; and in addition, to retain the reservoir/triggering mechanism's 2, 6 shape when depleted, thereby preventing an animal from taking advantage of a collapsed bladder-like component to slip out of the attachment device. The version of this embodiment shown in FIG. 4 comprises a rigid outward facing material 17 that braces the reservoir/triggering mechanism 2, 6 and contains openings through which holes 80 in the bladder are exposed. A standard or other restraint connector 10 may be used for attachment to a restraint. FIG. 5 through FIG. 10 also depict embodiments that use a bladder-like component with holes to serve as the reservoir/triggering mechanism and outlet.

Figure 5:
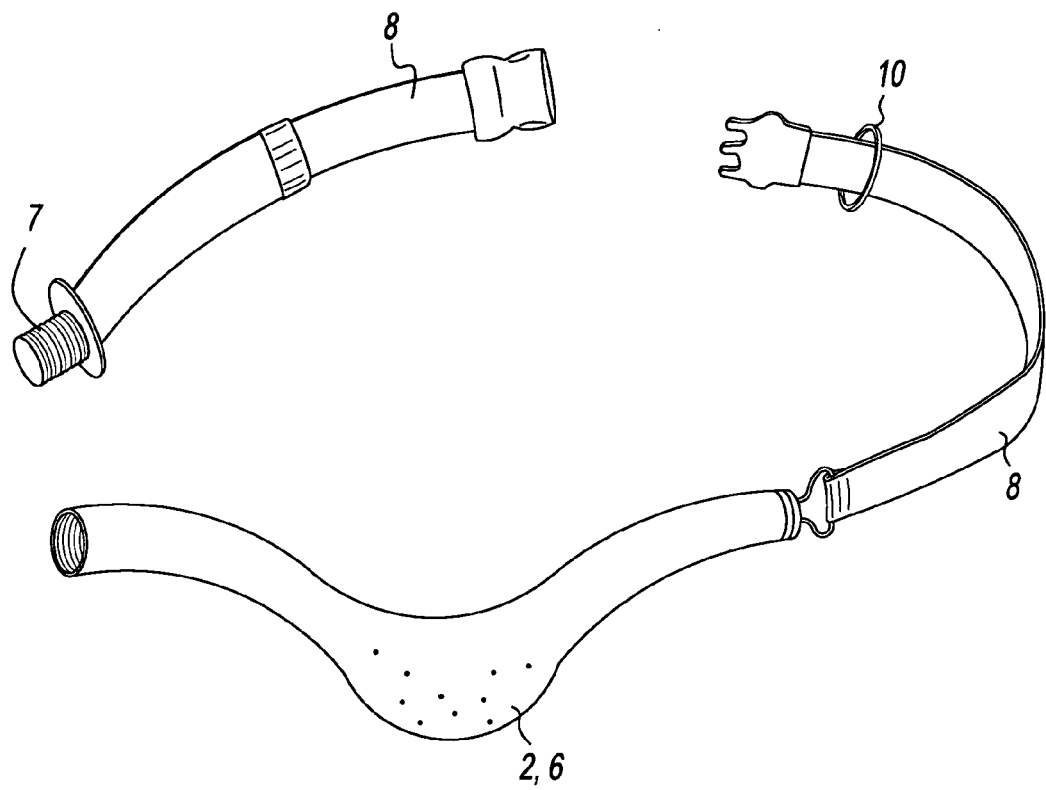

FIG. 5 depicts an embodiment that uses a bladder-like reservoir/triggering mechanism 2, 6 that is integrated within an attachment component 8, from which it may be unscrewed for refilling via the refill cap 7.

Figure 6:
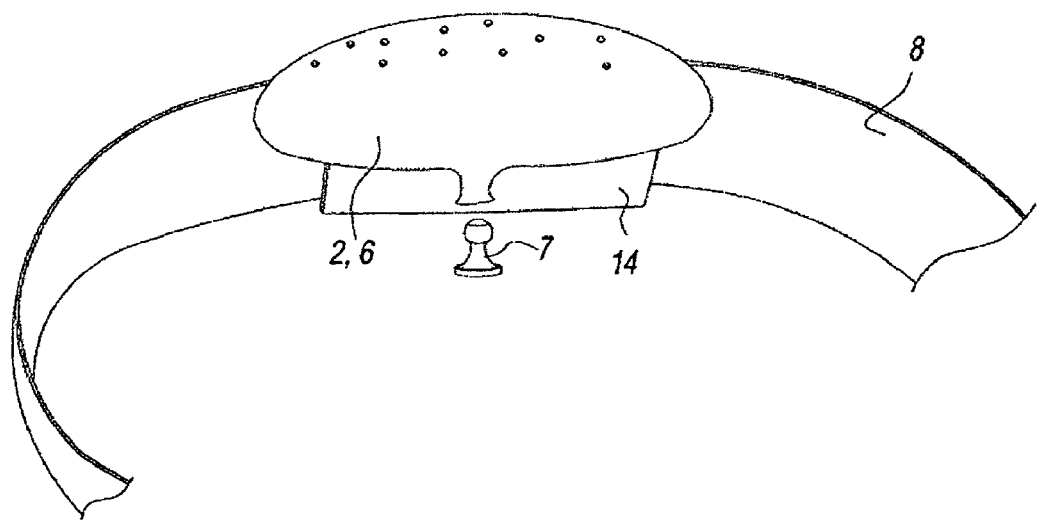
Figure 7:
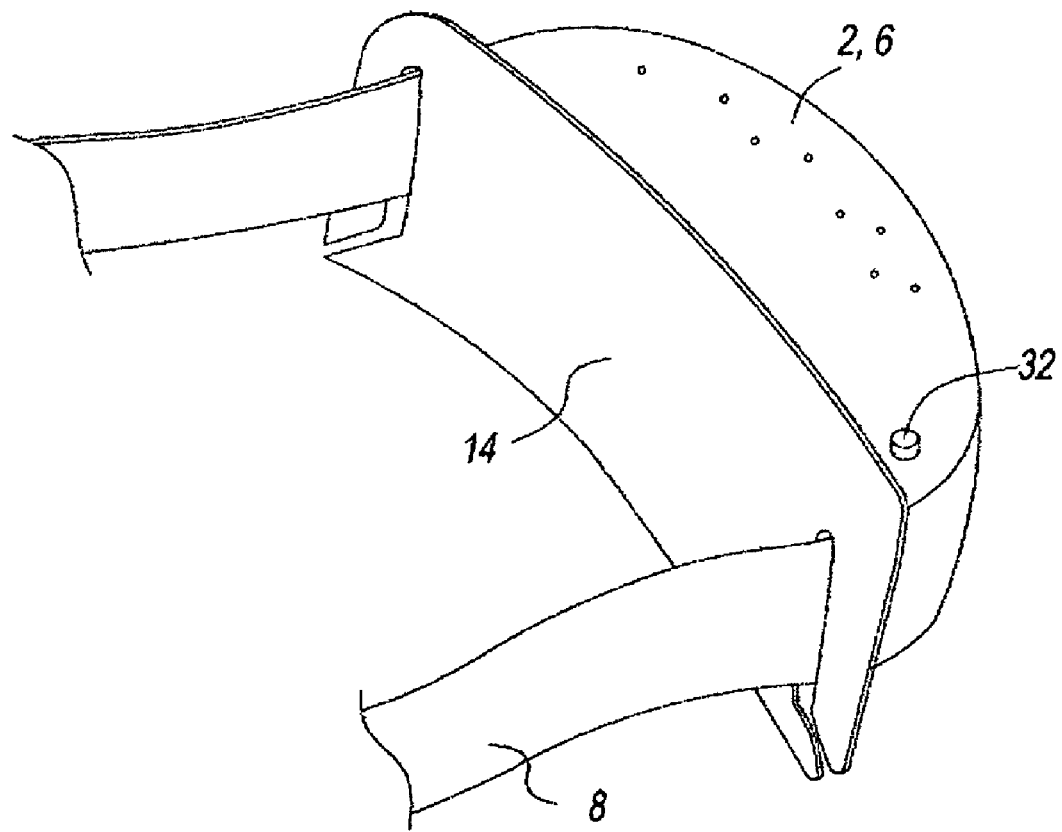
Figure 8:
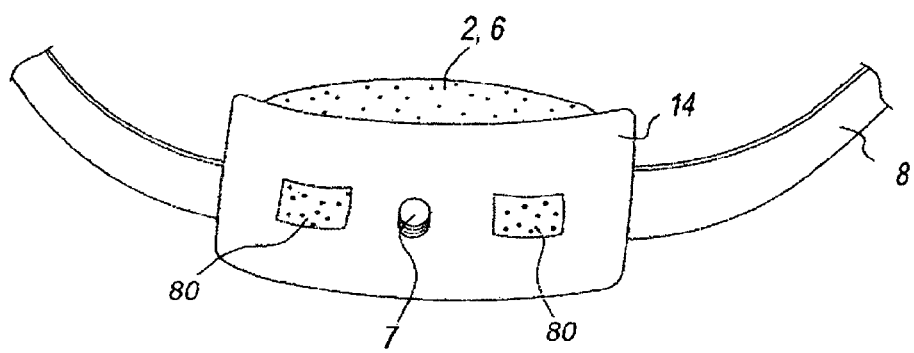
Figure 8A:
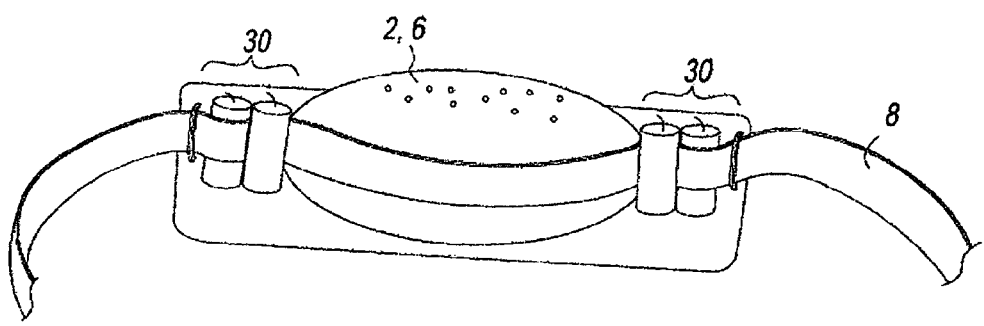

FIG. 6, FIG. 7, and FIG. 8 depict embodiments in which the bladder-like reservoir/triggering mechanism 2, 6 is fused to an attachment component 14 that is removably secured to paraphernalia that the animal regularly uses for connection to a restraining device, such as an everyday collar 8. In the embodiment of FIG. 6, the attachment component 14 is a clip 14 that fits over the top edge of the collar 8. The bladder-like reservoir/triggering mechanism 2, 6 is fused to the clip 14 and sits against the animal's neck inside the collar 8, with an accessible refill cap 7. In the FIG. 7 embodiment, a pliant backing with side slits 14 serves as the attachment component 14. The bladder-like reservoir/triggering mechanism 2, 6 with exposed injector refill port 32 is fused to the pliant backing 14, which sits against the animal's neck, with the bladder-like reservoir/triggering mechanism 2, 6 in-between the backing 14 and the inside of the collar 8. In the embodiment of FIG. 8, the attachment component 14 is a rigid backing to which the bladder-like reservoir/triggering mechanism 2, 6 is fused. The bladder-like reservoir/triggering mechanism 2, 6 is secured against the animal's neck by threading a collar 8 through retaining hoops and rollers 30 on the backing 8. As seen in FIG. 8A, cutouts on the backing's outward facing plane expose a refill cap 7 as well as output holes 80 for fluid release.

Figure 9:
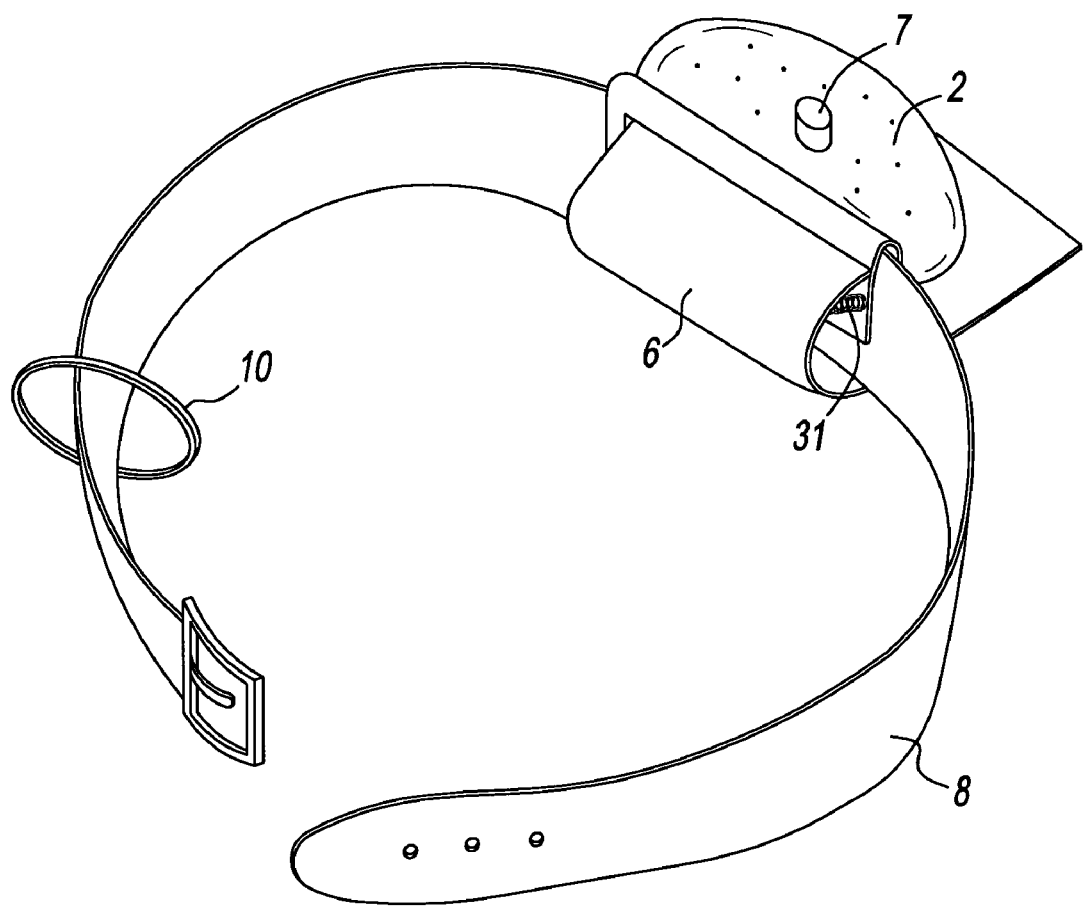

FIG. 9 depicts an embodiment in which the attachment component 8 is a collar 8. A bladder-like reservoir 2 is situated outside the collar 8, and a triggering mechanism 6 made of an optimally curved rigid plate 6 is pivotally connected to the collar 8 with springs 31 such that triggering pivots the plate upward to compress the bladder-like reservoir 2. The refill cap 7 is situated on top of the bladder-like reservoir 2.

Figure 10:
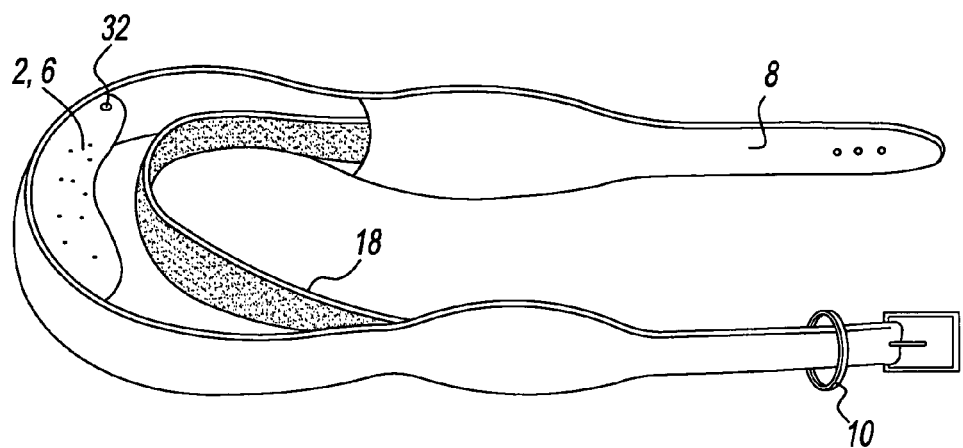
Figure 10A:
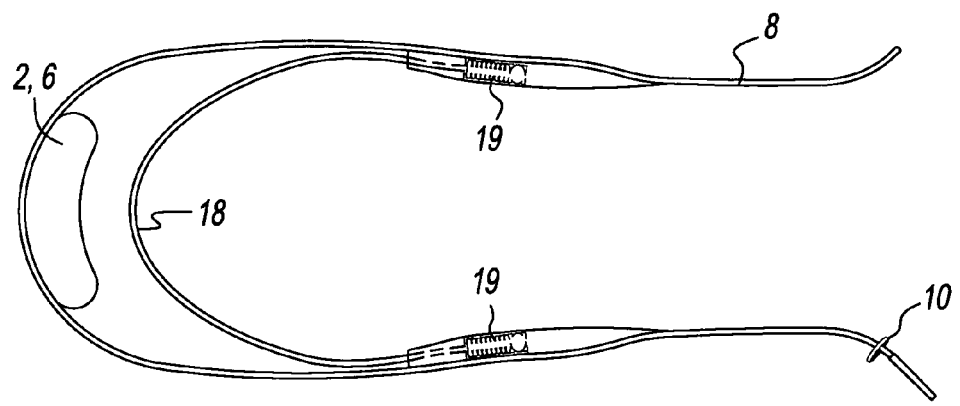

FIG. 10 and FIG. 10A depict an embodiment with a bladder-like component for its reservoir/triggering mechanism 2, 6, an injector refill port 32, and a collar 8 for its attachment component 8. A retractable inner collar 18 moves forward to compress the reservoir/triggering mechanism 2, 6 in accordance with a threshold set by tension adjustable springs 19 that are secured to the collar 8 as known in the art of tension adjustable springs. FIG. 10A shows this embodiment in cross-section viewed from below.

Figure 11:
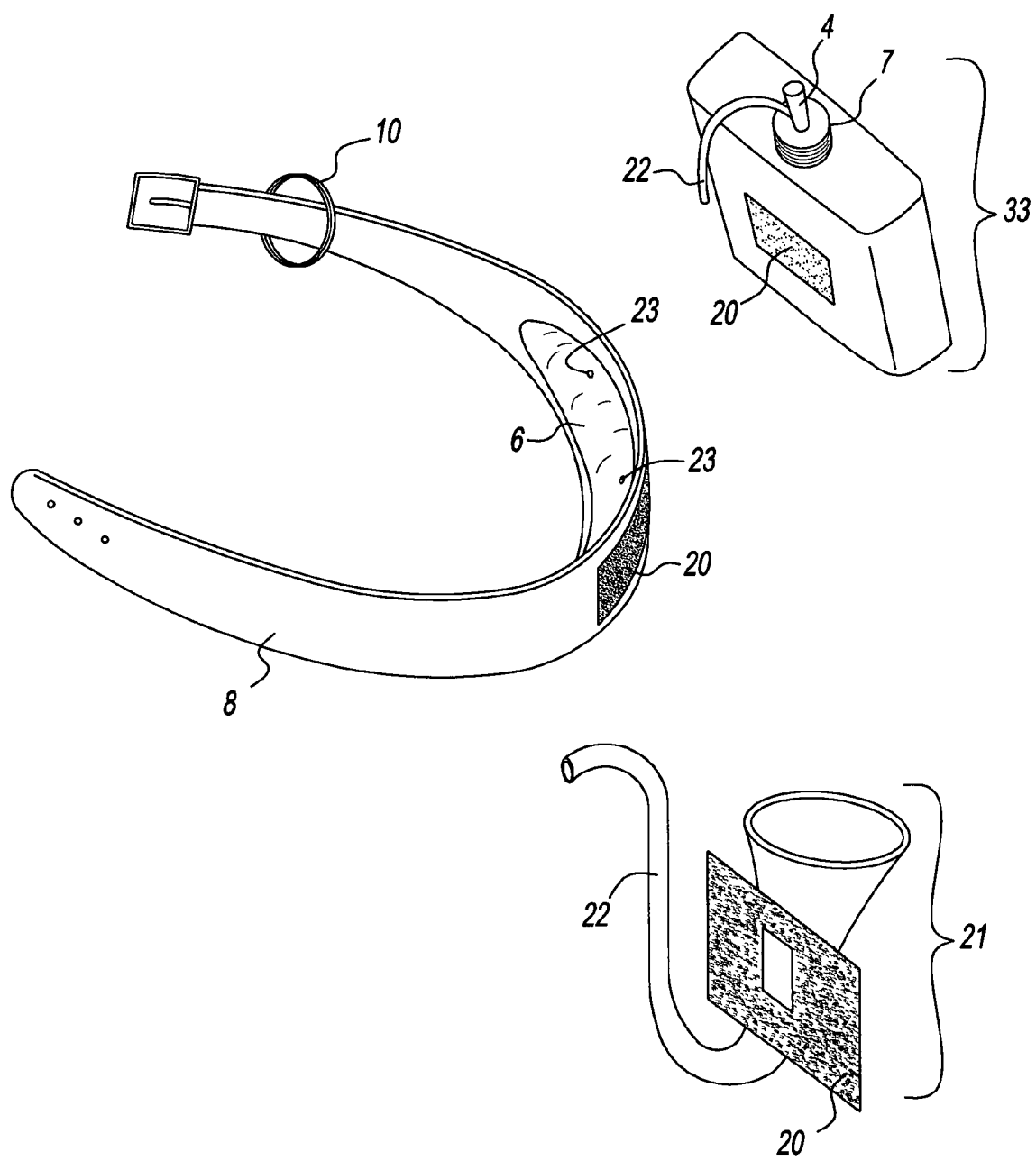

FIG. 11 depicts an embodiment in which the attachment component is a collar 8, and all training components are easily detachable from the front face of the collar 8 via a standard temporary binding material such as Velcro® 20. In the example shown, one available training component is a fluid dispersion device 33 with a spray nozzle assembly 4. Another training component is an air horn 21 for distracting or deterring the animal through noise. The triggering mechanism 6 is a contoured squeeze bulb 6 that is permanently affixed to the inside of the collar 8 and provides shock absorption for the animal's neck, whether or not training components are attached. All training components comprise a tube 22 adapted for attachment to holes 23 in the squeeze bulb 6. Attached training components are triggered simultaneously via the squeeze bulb 6.

Figure 12:
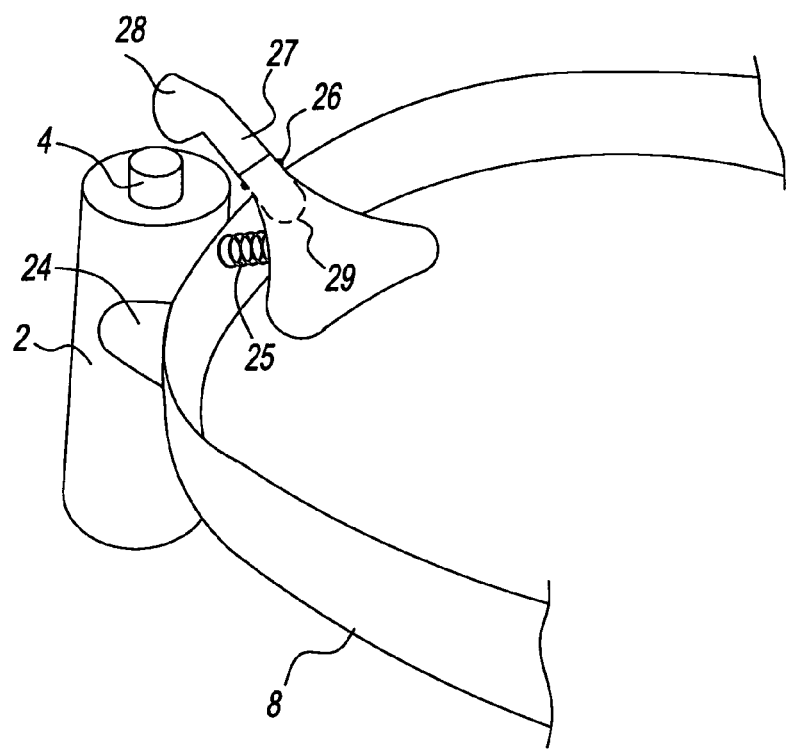
Figure 12A:
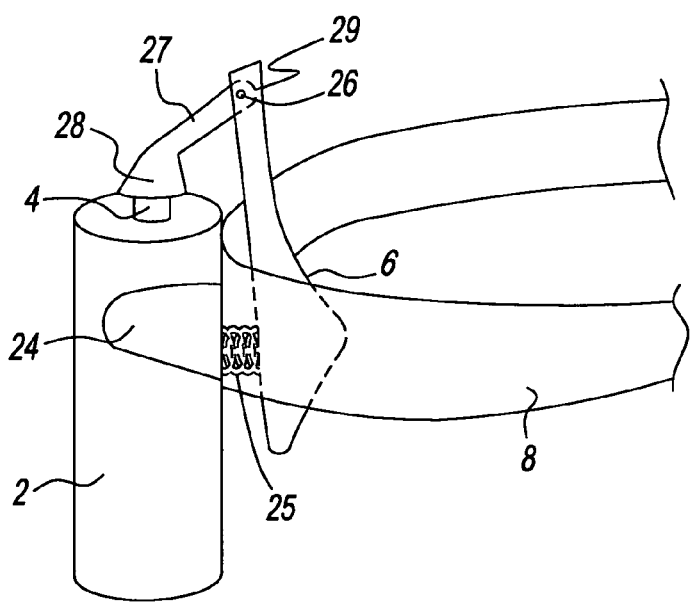

FIG. 12 and FIG. 12A depict an embodiment that uses inert gas as the substance that is released. The reservoir 2 is a pressurized aerosol can 2. It is impermanently secured to the outside of an attachment component 8 by a wire brace 24 or other conventional securing mechanism. In the embodiment illustrated, the attachment component 8 is a dog's collar 8, but adaptations for use with other attachment components is possible. The triggering mechanism 6 is a lever 6 that is positioned against the animal's neck and is secured to the front of the collar with a spring 25. The lever 6 protrudes past the top edge of the collar and is pivotally joined at its sides 26 to an extension arm 27 made of a rigid material. The end of the extension arm 27 forms a hammer head 28, appropriately angled and weighted so that it may depress the release valve 4 of the can 2 when the lever 6 is engaged. FIG. 13A shows a cross-section of this embodiment after the lever 6 has been depressed via a force between the animal's body and the restraint. This force, facilitated by the curvature 29 of the extension arm 27 against the smooth underside of the lever 6, pivots the hammer head 28 end of the extension arm 27 downward to depress the release valve 4 causing a continuous spray. Exact specifications of this mechanism are to be informed by the known art of lever mechanisms.

Notwithstanding the above descriptions of several embodiments of the invention, additional variations are possible that would not depart from the essence of the invention as laid out in the claims but may be envisioned by those skilled in the art.

What is claimed is:

1. An apparatus for controlling an animal restrained by a leash or other restraint, comprising:
    a) an attachment component for securing the apparatus to the animal;
    b) a reservoir for containing a distracting or deterring substance;
    c) a triggering mechanism, configured so that, when in use, the force of the animal's body against a taut leash or other restraint depresses the triggering mechanism to activate release of said substance;
    d) an outlet, through which said substance is released from said reservoir.

2. The apparatus according to claim 1, wherein said apparatus is configured to cushion the animal's body against forces between the animal's body and the leash or other restraint.

3. The apparatus according to claim 1, wherein said triggering mechanism is adjustable to varying thresholds.

4. The apparatus according to claim 1, wherein said substance is a gas.

5. The apparatus according to claim 4, wherein said reservoir is a pressurized aerosol can, said outlet is a nozzle on the aerosol can, and said triggering mechanism is a lever assembly that transfers a force between the animal's body and the leash or other restraint into force on a release valve on the aerosol can.

6. The apparatus according to claim 1, wherein said substance is a fluid.

7. The apparatus according to claim 6, wherein said outlet is a nozzle and spray assembly that communicates with said reservoir.

8. The apparatus according to claim 6, further comprising a fluid depletion indicator.

9. The apparatus according to claim 6, wherein said reservoir is refillable.

10. The apparatus according to claim 9, further comprising a mechanism adapted to restricting refill to specific fluids.

11. The apparatus according to claim 6, wherein said reservoir is adapted for replenishment by means of separately available fluid cartridges.

12. The apparatus according to claim 6, wherein said triggering mechanism is a lever that communicates to said reservoir and to with said outlet.

13. The apparatus according to claim 6, wherein said triggering mechanism is a squeeze bulb that communicates to said reservoir and said outlet.

14. The apparatus according to claim 6, wherein the functionality of said reservoir and of said triggering mechanism are both realized by a single resilient enclosure, and said outlet comprises one or more holes in said resilient enclosure wherefrom reserve fluid is released in response to triggering pressure on said resilient enclosure.

15. The apparatus according to claim 1, wherein said attachment component is removably secured to existing paraphernalia wherefrom an animal is connected to said leash or other restraint.

16. The apparatus according to claim 1, further comprising a means for offsetting rotation or other displacement of said apparatus consequent to the animal's lateral movements when advancing on said leash or other restraint.

17. The apparatus according to claim 1, further comprising an air horn attached to said attachment device and triggered by said triggering mechanism.

18. The apparatus according to claim 1, further comprising a means for countering excessive wind dispersion of said substance.

19. The apparatus according to claim 1, wherein said reservoir, said outlet, and any other components central to training are separable from said triggering mechanism and said attachment component, such that said triggering mechanism and said attachment component may be jointly used primarily for shock absorption and for connection to a restraint and only used for training when training components are attached thereto.

20. A method for training an animal while on a leash or other restraint, comprising:
   a) providing an apparatus for controlling an animal, comprising:
      i) an attachment component for attaching the apparatus to the animal;
      ii) a reservoir for containing a distracting or deterring substance;
      iii) a distracting or deterring substance;
      iv) a triggering mechanism, configured so that, when in use, the force of the animal's body against a taut leash or other restraint depresses the triggering mechanism to activate release of said substance;
   b) when in use, depressing the triggering mechanism, and
   c) dispersing said distracting or deterring substance in response to a taut leash or other restraint.

* * * * *